United States Patent [19]

Vergues

[11] 3,961,211
[45] June 1, 1976

[54] GYROSCOPE MOTOR
[75] Inventor: Jacques Vergues, Valence, France
[73] Assignee: Crouzet, Paris, France
[22] Filed: Dec. 31, 1974
[21] Appl. No.: 537,770

[30]    Foreign Application Priority Data
    Jan. 15, 1974  France .............................. 74.01366
[52] U.S. Cl. .............................. 310/68 C; 310/46;
        310/4 R; 318/438; 318/254; 323/94 H;
        338/32 H
[51] Int. Cl.² ........................................ H02K 11/00
[58] Field of Search ................. 318/138, 254, 513;
        323/92, 94 H; 310/40, 46, 67, 68 R, 68 B, 68
        C, 156, 190–193, DIG. 3, 664; 74/5–6;
        336/110; 338/32 H

[56]            References Cited
            UNITED STATES PATENTS
2,797,376   6/1957   Meade ................................. 318/254
2,814,743  11/1957   Johnson ........................... 336/110 X
2,821,675   1/1958   Ostenso et al. .................... 310/46 X
3,157,809  11/1964   Bekey ............................... 310/190 X
3,204,135   8/1965   Cohen et al. .......................... 310/46
3,314,002   4/1967   Wellford .............................. 323/92 X
3,320,520   5/1967   Pear, Jr. .............................. 323/94 H
3,346,792  10/1967   Noumi .................................. 318/138
3,735,216   5/1973   Vemura ............................... 318/138
3,738,175   6/1973   Linsig ................................ 338/32 H
3,860,843   1/1975   Kawasaki et al. ................. 310/67 X Primary Examiner—Donovan F. Duggan
Attorney, Agent, or Firm—Holman & Stern

[57]            ABSTRACT
Gyroscope motor of the type comprising a magnetized rotor constituted by a permanent magnet in the shape of a toroid, within which are disposed the stator windings, the commutation being ensured by means of a static detector operating by variation of the impedance of a winding placed in the magnetic circuit, wherein the saturation of said magnetic circuit is obtained directly by means of the field of the rotor.

1 Claim, 4 Drawing Figures

GYROSCOPE MOTOR

FIELD OF THE INVENTION

The present invention relates to gyroscope motors of the brushless d-c type comprising a magnetized rotor in the form of a toroid in which are disposed the stator windings, the commutation being ensured by static means.

BACKGROUND OF THE INVENTION

For detecting the angular position of the rotor it is known to employ Hall effect detectors or photosensitive elements cooperating with a source of light and a rotating slit. Such devices are either unstable as concerns temperature (Hall effect) or have a certain mechanical complexity which results in insufficient durability.

SUMMARY OF THE INVENTION

The device according to the invention avoids these drawbacks. According to the invention, there is provided a gyroscope motor of the type comprising a magnetized motor constituted by a permanent magnet in the shape of a toroid within which are disposed the stator windings, the commutation being ensured by means of a static detector operating by variation in the impedance of a winding placed in a magnetic circuit, wherein the saturation of said magnetic circuit is obtained directly by means of the field of the rotor.

Preferably, the static detector is constituted by:
a miniature ferrite core circuit containing a coil,
a rectangular-sided magnet of oriented ferrite,
an armature of a material having high permeability constituted by two rectangular strips connecting the magnet to the core circuit.

In one embodiment, the whole of the detector is placed in such manner that the armatures are perpendicular to the surface of the rotor so as to act as a collector of the lines of force. Thus the flux of the rotor is added to, or subtracted from, in the ferrite core, the flux of the auxiliary magnet according to the position of the rotor. In the case where the fluxes are subtracted, the circuit is unsaturated and the inductance of the coil is maximum. In the case where the fluxes are added, the circuit is saturated and the self inductance of the circuit is practically null. The coil of the circuit is excited at a frequency of 200 to 300 KHz.

The voltage at its terminals, which represents the saturation state, is employed for controlling the commutation and regulating the speed by modification of the commutation period.

If the rotor had been accidently started up in the wrong direction, the motive impulses would tend to brake it and would accelerate it in the right direction, since the state of the detector does not depend on the direction of rotation of the rotor but only on the position of the rotor with respect of the detector. Moreover, the fact of controlling the motive impulses during the periods in which the circuit of the detector is unsatured enables the detector to be employed as a safety thermostat. It is sufficient for this purpose to choose a ferrite core circuit whose Curie point is relatively low (100° to 150°C) and to place it in contact with the coil. As soon as the temperature of the latter reaches the Curie point, the inductance of the coil disappears and commutation is impossible. This application is of particular interest in a gyroscope motor which is capable of dissipating power of about 50 watts when blocked as against 5 watts at its normal speed of rotation of the order of 25,000 rpm.

DISCUSSION OF THE PREFERRED EMBODIMENT

The accompanying drawings illustrate by way of example an embodiment of the device according to the present invention.

BRIEF DESCRIPTION OF THE DRAWING

FIG. 1 is a diagrammatic view of a gyroscope motor comprising:
a permanent magnet rotor 1
stator poles 2—2' on which are disposed driving coils 8—8',
a static detector 3.

In this configuration, the lines of force of the rotor are in the same direction as those of the magnet. A large part of the flux of the magnet is deviated in the rotor and the core circuit is unsaturated. The impedance of the coil is maximum.

Figure 1:
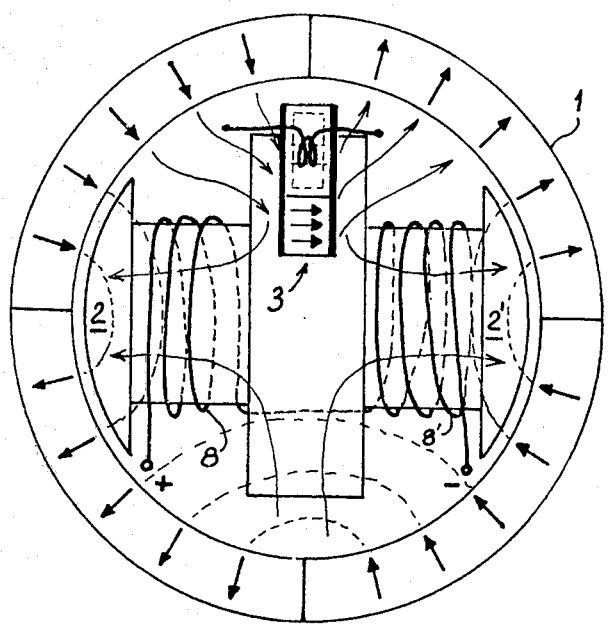
FIG. 1 depicts the device in flux-aiding relationship.
Figure 2:
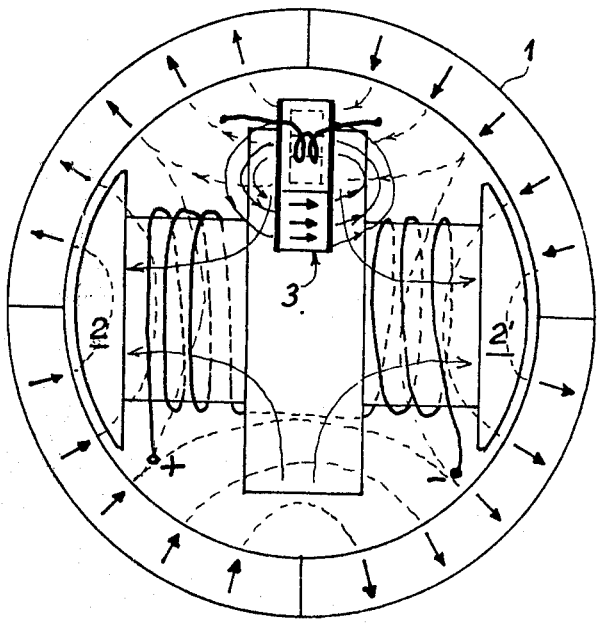
FIG. 2 depicts the device in flux-opposed relationship.

On the other hand in FIG. 2 the lines of force of the rotor are in the opposite direction to those of the magnet. Almost the whole of the flux of the magnet and of the flux of the rotor collected by the armatures passes through the magnetic circuit which is saturated. The impedance of the coil is in this case in the neighbourhood of the resistance of the wire.

Figure 3:
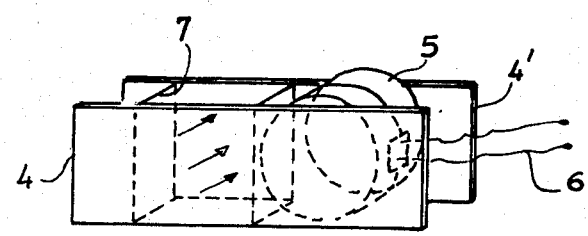
FIG. 3 depicts the static detector.

FIG. 3 shows the static detector comprising:
a ferrite core 5 inside a coil of 30 turns of 10/100 wire ($R = 1.2\Omega$),
a magnet 7 of oriented ferrite,
two armatures 4 and 4' of silicon sheet metal insulated by varnish which couples the ferrite core to the polarization magnet and to the rotor of the motor.

Figure 4:
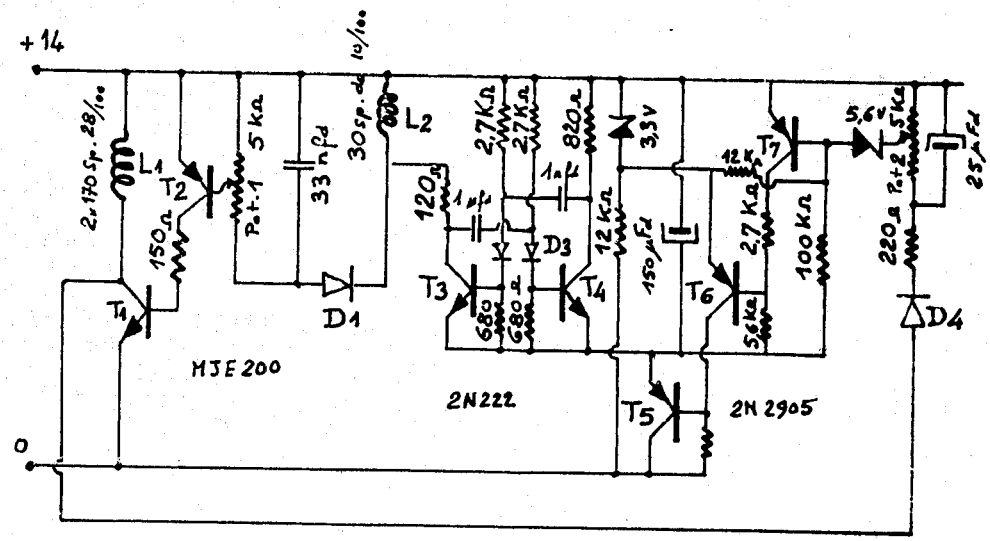
FIG. 4 is an exemplary control circuit.

FIG. 4 represents an example of an electronic control diagram. The transistors $T_1$ and $T_2$ constitute the power commutator in series with the motor coil $L_1$. The transistors $T_3$ and $T_4$ constitute a multivibrator. The coil $L_2$ of the position detector placed in the collector of $T_3$ in series with the 120$\Omega$ resistor generates negative peaks with respect to + 14 V upon each saturation of $T_3$.

The amplitude of these negative peaks is a function of the state of saturation of the $L_2$ circuit which represents the position of the rotor.

These negative peaks are detected by the diode $D_1$, integrated in the capacitor of 33 nfd and applied to the base of $T_2$ through a potentiometer of 5 K$\Omega$ which serves to regulate the commutation point.

The transistors $T_5$ and $T_6$ constitute a voltage regulator, $T_5$ being the ballast, $T_6$ the comparator amplifier, the Zener diode of 3.3 V the voltage reference.

When the transistor $T_7$ is saturated, the regulated voltage (emitter of $T_5$) is applied to the base of $T_6$ through the resistance bridge of 5.6 K$\Omega$ and 1.7 K$\Omega$.

Under these conditions, the regulated voltage is of the order of 10 V.

When the transistor $T_7$ is blocked, the regulated voltage is applied directly to the base of $T_6$ through the resistor of 5.6 K$\Omega$.

Under these conditions the regulated voltage is of the order of 4 V.

Consequently, the voltage applied to the multivibrator constituted by $T_3$ and $T_4$ and to coil $L_2$ of the position detector varies from 4 to 10 V according to the state of the transistor $T_7$. The voltage detected at the terminals of the capacitor of 33 nfd varies in the same ratio. Depending on the regulation of the potentiometer 1, the passage from 10 to 4 V of the regulated voltage decreases or cancels out the period of commutation of $T_1$ and $T_2$.

The counter-electromotive force of the motor at the terminals of $L_1$ is measured by the diode $D_4$, stored in the capacitor of 25 μfd, and applied to the base of $T_7$ through the potentiometer 2 and the Zener diode of 5.6 V.

The transistor $T_7$ is saturated by the current of the resistor of 12 K connected to the Zener diode of 3.3 V.

When the potential applied to the Zener diode of 5.6 V by the potentiometer 2 is higher, the diode is triggered and deviates the saturation current of $T_7$ which is blocked.

This reduces the commutation signal applied to $T_2$. The commutation time is reduced or rendered zero.

The resistor of 100 KΩ introduces a reaction which reduces the operation threshold of the regulation system to a value of 0.1 V measured at the terminals of the capacitor of 25 nfd. A lower value causes hunting of the regulation.

The device according to the invention may be employed for controlling collector-less and brushless d-c motors.

An application of particular interest is the regulation of a gyroscope motor.

What I claim is:

1. Gyroscope motor of the type comprising a magnetized rotor constituted by a permanent magnet in the shape of a toroid, within which are disposed the stator windings, the commutation being ensured by means of a static detector operating by variation of the impedance of a winding placed in the magnetic circuit, the saturation of said magnetic circuit being obtained directly by means of the field of the rotor; said detector comprising a miniature ferrite core circuit containing a coil, a rectangular-sided magnet of oriented ferrite, an armature of high permeability material comprising two rectangular strips connecting the magnet to the core circuit; said detector being disposed in such manner that its armatures are perpendicular to the surface of the rotor so as to act as a collector of the lines of force, and being in intimate contact with the driving coils of the motor, and the Curie point of its magnetic circuit being in the neighbourhood of 120°C so that it may serve as a safety thermostat.

* * * * *